United States Patent [19]
Ohtake

[11] Patent Number: 5,406,416
[45] Date of Patent: Apr. 11, 1995

[54] WIDEANGLE-RANGE-COVERING ZOOM LENS

[75] Inventor: Motoyuki Ohtake, Ohmiya, Japan

[73] Assignee: Nikon Corporation, Tokyo, Japan

[21] Appl. No.: 151,023

[22] Filed: Nov. 12, 1993

[30] Foreign Application Priority Data

Dec. 4, 1992 [JP] Japan .................. 4-325092

[51] Int. Cl.$^6$ .................. G02B 15/14; G02B 13/18
[52] U.S. Cl. .................. 359/686; 359/708
[58] Field of Search .................. 359/686, 708

[56] References Cited

U.S. PATENT DOCUMENTS

| | | | |
|---|---|---|---|
| 4,787,718 | 11/1988 | Cho | 359/686 |
| 5,111,338 | 5/1992 | Nakayama | 359/686 |

FOREIGN PATENT DOCUMENTS 62-235916 10/1987 Japan .
63-271214 11/1988 Japan .
3-240015 10/1991 Japan .

*Primary Examiner*—Scott J. Sugarman
*Attorney, Agent, or Firm*—Shapiro and Shapiro

[57] ABSTRACT

A wideangle-range-covering zoom lens comprises a first lens group having a negative refracting power, a second lens group having a positive refracting power, which is arranged coaxially with the first lens group and adjacent to the first lens group on a side thereof opposite to a subject, a third lens group having a positive refracting power, which is arranged coaxially with the second lens group and adjacent to the second lens group on a side thereof opposite to the subject, and a fourth lens group having a negative refracting power, which is arranged coaxially with the third lens group and adjacent to the third lens group on a side thereof opposite to the subject, in which the lens groups are relatively moved in zooming from a wideangle end to a telephoto end such that a gap decreases between the first lens group and the second lens group, a gap increases between the second lens group and the third lens group, and a gap decreases between the third lens group and the fourth lens group, and in which predetermined conditions are satisfied.

4 Claims, 3 Drawing Sheets

(WIDE)

(TELE)

FILM SIDE

W

M

T

FILM SIDE

W

M

T

FILM SIDE

WIDEANGLE-RANGE-COVERING ZOOM LENS

BACKGROUND OF THE INVENTION

1. Field of the Invention

The present invention relates to a compact zoom lens with high zoom ratio suitable for lens shutter cameras or video cameras.

2. Related Background Art

There are a variety of zoom types recently proposed for the purpose of size reduction and increase of zoom ratio in zoom lenses used for lens shutter cameras or video cameras. In the zoom lenses, a negative lens group is arranged closest to an image plane for reduction of total length and compensation of curvature of field.

In the zoom lenses there is known a zoom type composed of two lens groups having a positive refracting power and a negative refracting power, respectively. Japanese Laid-open Patent Application No. 62-235916 discloses such a zoom type, in which the positive lens group includes three separate lens groups, i.e., the 1$a$ lens group of negative refracting power, the 1$b$ lens group of positive refracting power and the 1$c$ lens group of positive refracting power and in which in zooming a gap decreases between the 1$a$ lens group and the 1$b$ lens group while a gap increases between the 1$b$ lens group and the 1$c$ lens group.

Also, Japanese Laid-open Patent Application No. 63-271214 discloses another zoom type, in which there are three lens groups, i.e., the first lens group of negative refracting power, the second lens group of positive refracting power and the third lens group of negative refracting power arranged in the named order from the object side and in which in zooming from the wideangle end to the telephoto end a gap decreases between the first lens group and the second lens group and a gap also decreases between the second lens group and the third lens group, whereby the changes of image magnification of the first lens group and the third lens group are always used for increasing the total magnification.

Further, Japanese Laid-open Patent Application No. 3-240015 discloses another zoom type composed of four lens groups which are negative, positive, positive and negative in the named order from the object side, thereby to achieve a high zoom ratio.

In the arrangement as disclosed in Japanese Laid-open Patent Application No. 62-235916, the image magnification of each lens group changes in zooming from the wideangle end to the telephoto end such that that of the second lens group decreases but that of the third lens group increases. Since there is almost no change in overall refracting power of the first to third lens groups, the substantial zooming is carried out only by the fourth lens group. Accordingly, to increase the zoom ratio in this arrangement, the image magnification of the fourth lens group must have a great change, which is not preferable in that aberration change is unavoidable in zooming.

In the arrangement as disclosed in Japanese Laid-open Patent Application No. 63-271214, the image magnification is changed in zooming by the second lens group and the third lens group, which is favorable for increase of zoom ratio in respect of arrangement of refracting power. However, since the refracting power of the second lens group is very strong in positive, angles of off-axial rays passing through the second lens group change greatly in zooming, but the heights of off-axial rays scarcely change. Therefore, the change of off-axial aberration is unavoidable in zooming, which makes the increase of zoom ratio difficult.

In the arrangement as disclosed in Japanese Laid-open Patent Application No. 3-240015, the composite refracting power of the third lens group and the fourth lens group is a little positive at the wideangle end, which results in failing to keep back focus sufficient. Also, since the gap between the first lens group and the second lens group changes greatly in zooming, the total length and the effective diameter of the lens closest to an object (as will be referred to as front lens effective diameter) become huge at the wideangle end, which is unsatisfactory in respect of size reduction.

SUMMARY OF THE INVENTION

It is an object of the present invention to provide a zoom lens covering the wideangle range, which is relatively short in total length of lens, compact in size, and excellent in image-forming performance.

A zoom lens according to the present invention comprises a first lens group with negative refracting power, a second lens group with positive refracting power, a third lens group with positive refracting power, and a fourth lens group with negative refracting power arranged in the named order from the object side, in which the lens groups are relatively moved in zooming from the wideangle end to the telephoto end such that a gap decreases between the first lens group and the second lens group, a gap increases between the second lens group and the third lens group, and a gap decreases between the third lens group and the fourth lens group, and which satisfies the following conditions of Equations (1) and (2):

$$0.1 < \phi_{1,2T}/\phi_T; \tag{1}$$

$$\phi_{1,2W}/\phi_W < 0.57; \tag{2}$$

where $\phi_{1,2T}$: composite refracting power of the first lens group and the second lens group at the telephoto end;

$\phi_T$: overall refracting power of the total system at the telephoto end;

$\phi_{1,2W}$: composite refracting power of the first lens group and the second lens group at the wideangle end;

$\phi_W$: overall refracting power of the total system at the wideangle end.

Another zoom lens according to the present invention comprises a first lens group with negative refracting power, a second lens group with positive refracting power, a third lens group with positive refracting power, and a fourth lens group with negative refracting power arranged in the named order from the object side, in which the lens groups are relatively moved in zooming from the wideangle end to the telephoto end such that a gap decreases between the first lens group and the second lens group, a gap increases between the second lens group and the third lens group, and a gap decreases between the third lens group and the fourth lens group, and which satisfies the following conditions of Equation (3):

$$\beta_4/\beta_2 > 1; \tag{3}$$

$$\beta_4 > 1;$$

$\beta_2 > 1$;

where
- $\beta_4$: amount expressed by the following equation if use magnifications of the fourth lens group at the wideangle end and at the telephoto end are $\beta_{4W}$ and $\beta_{4T}$, respectively: $\beta_4 = \beta_{4T}/\beta_{4W}$;
- $\beta_2$: amount expressed by the following equation if use magnifications of the second lens group at the wideangle end and at the telephoto end are $\beta_{2W}$ and $\beta_{2T}$, respectively: $\beta_2 = \beta_{2T}/\beta_{2W}$.

DESCRIPTION OF THE PREFERRED EMBODIMENTS

Figure 1A:
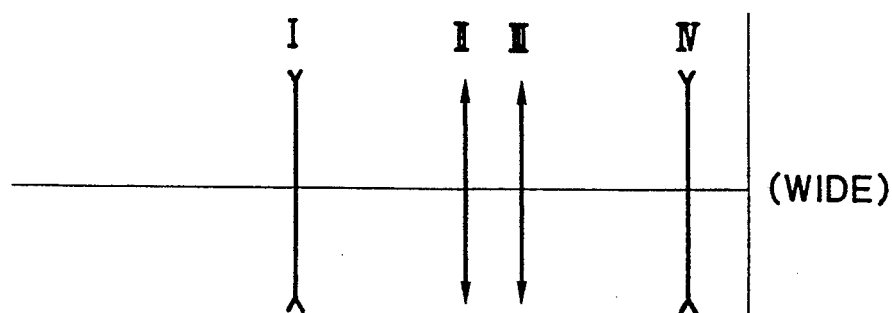
FIGS. 1A and 1B are drawings to schematically show the principle of the present invention.
Figure 1B:
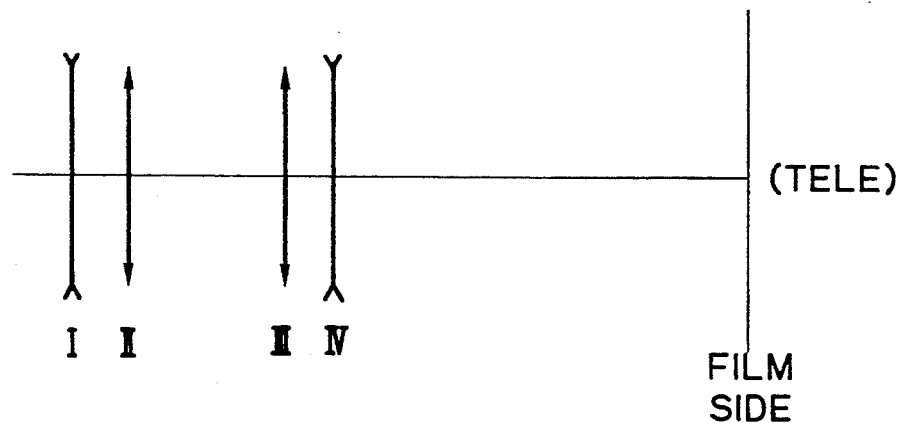

FIGS. 1A and 1B are drawings to schematically show the principle of the present invention. FIG. 1A shows a zoom position at the wideangle end while FIG. 1B that at the telephoto end. In the drawings, I represents the first lens group of negative refracting power, II the second lens group of positive refracting power, III the third lens group of positive refracting power, and IV the fourth lens group of negative refracting power.

The following describes the arrangement of refracting power in the present invention. Generally, it is important in pursuit of size reduction, angle increase and increase of zoom ratio that the principal point of the total system be located near the lens plane closest to the film surface at the wideangle end to keep back focus appropriate. It is thus desirable that the arrangement of refracting power is close to that in the so-called retrofocus type. At the telephoto end, it is desirable that the arrangement of refracting power is close to that in the so-called telephoto type in order to keep the total length of zoom lens as short as possible.

If a component of positive refracting power and a component of negative refracting power are arranged at a gap d between their principal points, a composite refracting power thereof becomes somewhat positive in zooming from the wideangle end to the telephoto end when the principal point gap d decreases. Thus the following arrangement is employed in the present invention:

(a) The principal point gap is decreased between the first lens group and the second lens group;

(b) The principal point gap is decreased between the third lens group and the fourth lens group.

With above (a) and (b), the image magnifications of the second lens group and the fourth lens group are arranged to change greatly in zooming thereby to attain a high zoom ratio.

Observing the second lens group and the third lens group independently, the principal point gap is increased in zooming between the second lens group and the third lens group thereby to enhance the zoom ratio.

Generally, either one of below (c) and (d) is necessary for increasing the zoom ratio if a positive lens component and a negative lens component are arranged at a principal point gap d and if zooming is effected by changing the principal point gap:

(c) Increasing the both refracting powers of the positive lens component and the negative lens component;

(d) Increasing a change amount of the principal point gap d.

In Japanese Laid-open Patent Application No. 3-240015, the third lens group leaves the aperture stop at the telephoto end to have a weak positive refracting power, which results in insufficient correction of upper coma. Further, since the fourth lens group has a weak negative refracting power, the effective diameter of the lens closest to the image plane (as will be referred to as rear lens effective diameter) cannot be made smaller at the wideangle end.

Also, the second lens group in the Japanese Laid-open Application has a great change of image magnification in zooming, so that angles of off-axial rays passing through the second lens group change greatly in zooming but the heights of the off-axial rays are kept almost unchanged. Thus it is difficult to suppress the aberration change in zooming, and more constituent lenses are necessary.

Considering the above points, the present invention achieved the zoom lens covering the wideangle range, which is compact, excellent in image-forming performance, and suitable for increasing the zoom ratio, by such an arrangement that the second lens group and the fourth lens group are used for increasing the total magnification in zooming and that the change of image magnification of the fourth lens group in zooming is set greater than that of the second lens group in zooming.

Thus, the zoom lens in the present invention comprises a first lens group of negative refracting power, a second lens group of positive refracting power, a third lens group of positive refracting power, and a fourth lens group of negative refracting power arranged in the named order from the object side, in which the first lens group has a negative refracting power to keep back focus sufficient at the wideangle end and to correct the astigmatic aberration and the coma for off-axial rays, and in which the second lens group and the third lens group each have a positive refracting power and the principal point gap therebetween is changed in zooming thereby to satisfactorily suppress the change of off-axial aberration in zooming. Additionally, the fourth lens group has a negative refracting power to shorten the total length and to correct the image plane.

Further, the present invention enables satisfactory correction of distortion and coma by such an arrangement that a stop is disposed in the second lens group, in the third lens group, or between the second lens group and the third lens group and that the stop is moved in zooming in synchronism with the second lens group or the third lens group or independently thereof. Further, the zoom lens preferably satisfies the conditions as described hereinbefore. The conditions will be detailed in the following.

The condition of Equation (1) defines the composite refracting power of the first lens group and the second lens group at the telephoto end. In the range below the lower limit, the composite refracting power of the first lens group and the second lens group becomes slightly positive, which unfavorably increases the total length of lens at the telephoto end. Also, the upper limit may be preferably set at 1.2 in order to obtain further higher optical performance.

The condition of Equation (2) defines the composite refracting power of the first lens group and the second lens group at the wideangle end. In the range above the upper limit, the composite refracting power of the first lens group and the second lens group becomes greater in positive and the heights of off-axial rays passing through the first lens group and the second lens group are apart from the optical axis, which increases the effective diameter of each lens against the desire of size reduction. In order that the overall refracting power of the total system is kept constant at the wideangle end, the position of principal point of the total system becomes closer to the object, which results in failing to keep the back focus sufficient, which could produce ghost between the film plane and the plane closest to the film plane, and which unfavorably increases the rear lens effective diameter. The lower limit may be preferably set at 0.1 in order to obtain further higher image-forming performance.

Higher optical performance can be achieved by simultaneously satisfying the conditions of Equation (1) and Equation (2).

The condition of Equation (3) defines a relation between changes in image magnification of the second lens group and the fourth lens group in zooming from the wideangle end to the telephoto end.

In the range below the lower limit in the condition of Equation (3), the change in image magnification of the second lens group becomes greater than that of the fourth lens group in zooming from the wideangle end to the telephoto end. As described above, in case of the change in image magnification of the second lens group becoming greater in zooming, angles of off-axial rays passing through the second lens group change greatly in zooming but the heights thereof scarcely change, which results in failing to suppress the aberration change in zooming. Also, the off-axial rays passing through the first lens group become further apart from the optical axis at the wideangle end, which increases the front lens effective diameter.

In the above arrangement, the following conditions should be preferably satisfied to obtain further better performance:

$$\phi_{3,4T}/\phi_T < 0.8; \quad (4)$$

$$0.16 < \phi_{3,4W}/\phi_W; \quad (5)$$

where $\phi_{3,4T}$: composite refracting power of the third lens group and the fourth lens group at the telephoto end;

$\phi_T$: overall refracting power of the total system at the telephoto end;

$\phi_{3,4W}$: composite refracting power of the third lens group and the fourth lens group at the wideangle end;

$\phi_W$: overall refracting power of the total system at the wideangle end.

The condition of Equation (4) defines a composite refracting power of the third lens group and the fourth lens group at the telephoto end. In the range above the upper limit, the composite refracting power of the third lens group and the fourth lens group becomes greater in positive. In order that the focal length is kept constant at the telephoto end in that case, the position of principal point of the total system becomes closer to the film plane, which results in increasing the total length at the telephoto end. The lower limit may be preferably set at −0.4 in order to obtain further higher optical performance.

The condition of Equation (5) defines a composite refracting power of the third lens group and the fourth lens group at the wideangle end. In the range below the lower limit, the principal point position of the total system becomes closer to the object in order that the refracting power of the total system is kept constant at the wideangle end. Then sufficient back focus cannot be assured and ghost could unfavorably appear between the film plane and the lens plane closest to the image. Further, the rear lens effective diameter also unfavorably increases. The upper limit may be preferably set at 0.8 to obtain further better image-forming performance.

Higher optical performance can be attained by simultaneously satisfying the conditions of Equation (4) and Equation (5).

In the present invention, the lens barrel can be simplified by such an arrangement that the first lens group and the third lens group are moved together as united in zooming or that the second lens group and the fourth lens group are moved together as united in zooming.

Embodiments according to the present invention will be described in detail.

Figure 2A:
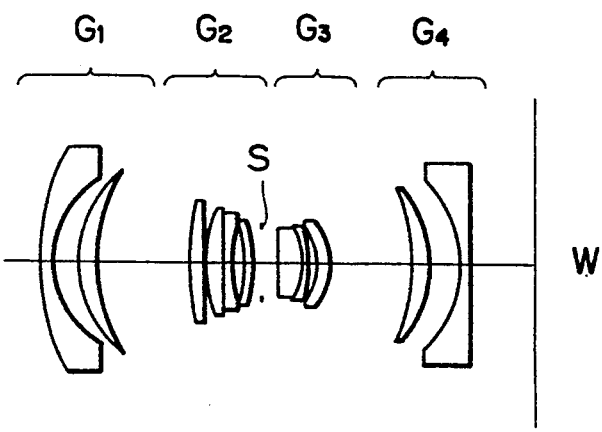
FIGS. 2A to 2C are lens construction drawings to show the first embodiment to the third embodiment.
Figure 2B:
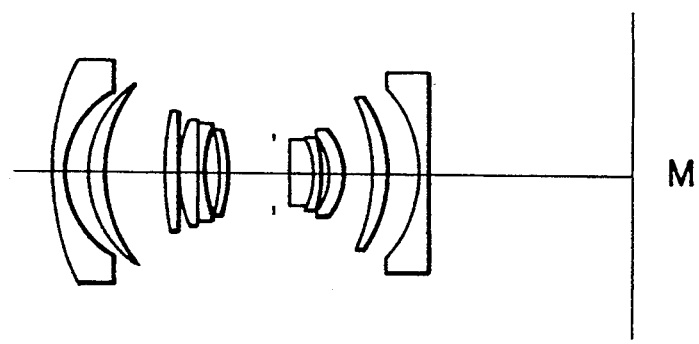
Figure 2C:
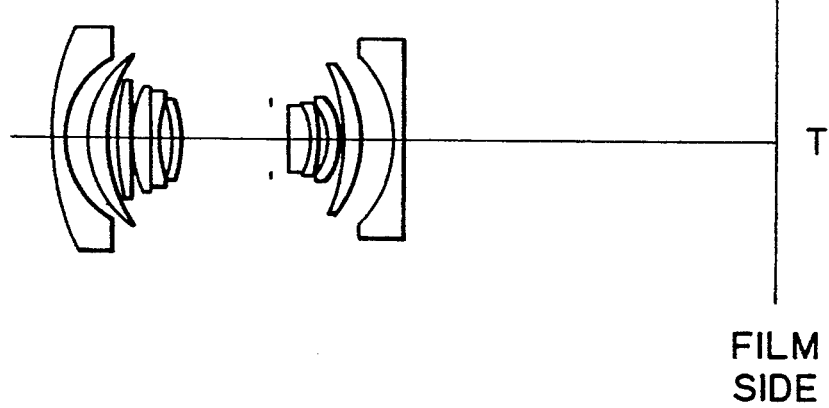

FIGS. 2A to 2C are lens construction drawings to show the first embodiment to the third embodiment, respectively depicting a state at the wideangle end (W), a state at a middle focus position (M), and a state at the telephoto end (T).

There are a first lens group $G_1$ with negative refracting power composed of a negative meniscus lens convex toward the object and a positive meniscus lens convex toward the object, a second lens group $G_2$ with positive refracting power composed of a compound lens of positive meniscus lens and negative meniscus lens and a positive meniscus lens, an aperture stop S, a third lens group $G_3$ with positive refracting power composed of a compound lens of double convex lens and negative meniscus lens and a positive meniscus lens concave toward the object, and a fourth lens group $G_4$ with negative refracting power composed of a positive meniscus lens concave toward the object and a negative meniscus lens, arranged in the named order from the object side such that the lens groups move relative to each other in zooming from the wideangle end to the telephoto end as the gap decreases between the first lens group $G_1$ and the second lens group $G_2$, the gap increases between the second lens group $G_2$ and the third lens group $G_3$, and the gap decreases between the third lens group $G_3$ and the fourth lens group $G_4$.

Specifications in the present invention will be listed below. In the tables of specifications of the embodiments, f represents the focal length, $F_{NO}$ the f-number, $2\omega$ the field angle, numerals in the left end column orders counted from the object side, and * an aspherical surface. Further, r represents a radius of curvature of each lens surface, d a spacing between lens planes, n and $\nu$an index of refraction and an Abbe's number for d line ($\lambda=587.6nm$). The shape of aspherical surface can be expressed by the following equation with X axis in the direction of optical axis, Y axis in the direction normal to the optical axis, and the traveling direction of light being positive.

$$x=cy^2/\{1+(1-\kappa c^2 y^2)^{\frac{1}{2}}\}+C_4 y^4 + C_6 y^6 + C_8 y^8 + C_{10} y^{10}$$

In the equation, c is a paraxial curvature, κa parameter for the surface of the second order, and $C_4$,

TABLE 1

(Specifications for Embodiment 1)

f = 28.8–50.0–82.5
$F_{NO}$ = 3.4–5.3–8.2
2ω = 75.0–46.6–29.2

|  | r | d | ν | n |
|---|---|---|---|---|
| 1 | 30.5677 | 1.50 | 46.54 | 1.80411 |
| 2 | 12.1148 | 3.20 |  | 1.0 |
| *3 | 14.4438 | 2.40 | 25.35 | 1.80518 |
| 4 | 21.8590 | (variable) |  | 1.0 |
| 5 | 143.4210 | 1.40 | 45.37 | 1.79668 |
| 6 | −83.1373 | 0.10 |  | 1.0 |
| 7 | 14.4316 | 2.40 | 50.84 | 1.65844 |
| 8 | 63.7974 | 1.00 | 25.41 | 1.80518 |
| 9 | 14.4998 | 2.00 |  | 1.0 |
| 10 | −15.5241 | 1.30 | 60.14 | 1.62041 |
| 11 | −13.8603 | (variable) |  | 1.0 |
| 12 | ∞ | 2.10 |  | 1.0 (stop) |
| 13 | 47.9343 | 3.30 | 53.48 | 1.54739 |
| 14 | −8.3348 | 1.00 | 33.89 | 1.80384 |
| 15 | −14.0449 | 1.10 |  | 1.0 |
| 16 | −8.6868 | 1.60 | 49.52 | 1.74443 |
| 17 | −9.3679 | (variable) |  | 1.0 |
| 18 | −24.8342 | 2.00 | 25.41 | 1.80518 |
| 19 | −16.6686 | 4.00 |  | 1.0 |
| 20 | −14.6764 | 1.20 | 43.35 | 1.84042 |
| 21 | −426.1521 | (variable) |  | 1.0 |

Shape of Aspherical Surface of the Third Plane

κ = 1.0000   $C_4 = -0.3754 \times 10^{-5}$   $C_6 = -0.3064 \times 10^{-7}$
$C_8 = -0.3250 \times 10^{-9}$   $C_{10} = 0.6231 \times 10^{-12}$ Variable Spacings in Zooming

| f | 28.8005 | 50.0012 | 82.5028 |
|---|---|---|---|
| D 4 | 11.3636 | 5.3643 | 1.3643 |
| D11 | 0.9921 | 6.9914 | 10.9914 |
| D17 | 10.9028 | 4.3844 | 0.3685 |
| D21 | 9.6989 | 29.6910 | 59.7194 |

Values for the Conditions (1) $\phi_{1,\,2T}/\phi_T = 0.284$
(2) $\phi_{1,\,2W}/\phi_W = 0.190$
(3) $\beta_4/\beta_2 = 1.224$
(4) $\phi_{3,\,4T}/\phi_T = 0.658$
(5) $\phi_{3,\,4W}/\phi_W = 0.610$

TABLE 2

(Specifications for Embodiment 2)

f = 28.8–50.0–82.5
$F_{NO}$ = 3.7–5.7–8.2
2ω = 74.8–46.2–28.8

|  | r | d | ν | n |
|---|---|---|---|---|
| 1 | 32.8659 | 1.50 | 46.54 | 1.80411 |
| 2 | 12.5127 | 3.20 |  | 1.0 |
| *3 | 14.2238 | 2.40 | 25.35 | 1.80518 |
| 4 | 21.2370 | (variable) |  | 1.0 |
| 5 | 38.8704 | 1.70 | 45.37 | 1.79668 |
| 6 | 700.8698 | 0.10 |  | 1.0 |
| 7 | 17.2039 | 2.50 | 54.01 | 1.61720 |
| 8 | 1645.2709 | 1.00 | 25.41 | 1.80518 |
| 9 | 17.8546 | 1.60 |  | 1.0 |
| 10 | −27.1402 | 1.30 | 60.23 | 1.51835 |
| 11 | −17.1288 | (variable) |  | 1.0 |
| 12 | ∞ | 2.10 |  | 1.0 (stop) |
| 13 | 94.8522 | 3.30 | 53.48 | 1.54739 |
| 14 | −8.9315 | 1.00 | 39.61 | 1.80454 |
| 15 | −14.6464 | 1.10 |  | 1.0 |
| 16 | −7.9836 | 1.60 | 49.52 | 1.74443 |
| 17 | −8.7834 | (variable) |  | 1.0 |
| 18 | −23.1960 | 2.00 | 25.41 | 1.80518 |
| 19 | −16.8792 | 4.50 |  | 1.0 |
| 20 | −15.8373 | 1.20 | 43.35 | 1.84042 |
| 21 | −814.6772 | (variable) |  | 1.0 |

Shape of Aspherical Surface of the Third Plane

κ = 1.0000   $C_4 = -0.5940 \times 10^{-5}$   $C_6 = -0.9853 \times 10^{-7}$
$C_8 = -0.6601 \times 10^{-9}$   $C_{10} = 0.6330 \times 10^{-11}$ Variable Spacings in Zooming

| f | 28.8002 | 50.0003 | 82.5003 |
|---|---|---|---|
| D 4 | 11.4370 | 6.4370 | 0.4370 |
| D11 | 1.1173 | 6.1173 | 12.1173 |
| D17 | 11.2242 | 3.9759 | 0.4841 |
| D21 | 8.9842 | 28.8754 | 55.2668 |

Values for the Conditions (1) $\phi_{1,\,2T}/\phi_T = 0.859$
(2) $\phi_{1,\,2W}/\phi_W = 0.432$
(3) $\beta_4/\beta_2 = 1.495$
(4) $\phi_{3,\,4T}/\phi_T = 0.063$
(5) $\phi_{3,\,4W}/\phi_W = 0.294$

TABLE 3

(Specifications for Embodiment 3)

f = 28.8–50.0–82.5
$F_{NO}$ = 3.7–5.6–8.2
2ω = 74.6–46.1–29.0

|  | r | d | ν | n |
|---|---|---|---|---|
| 1 | 28.8777 | 1.50 | 46.54 | 1.80411 |
| 2 | 12.7485 | 3.20 |  | 1.0 |
| *3 | 14.8923 | 2.40 | 25.35 | 1.80518 |
| 4 | 21.6189 | (variable) |  | 1.0 |
| 5 | 59.5835 | 1.70 | 45.37 | 1.79668 |
| 6 | 395.5264 | 0.10 |  | 1.0 |
| 7 | 17.8000 | 2.50 | 60.03 | 1.64000 |
| 8 | 152.2475 | 1.00 | 25.41 | 1.80518 |
| 9 | 20.7825 | 1.30 |  | 1.0 |
| 10 | −30.0092 | 1.50 | 60.41 | 1.62041 |
| 11 | −20.3285 | (variable) |  | 1.0 |
| 12 | ∞ | 2.10 |  | 1.0 (stop) |
| 13 | 97.0439 | 3.30 | 56.05 | 1.56883 |
| 14 | −8.6051 | 1.00 | 39.61 | 1.80454 |
| 15 | −14.3813 | 1.10 |  | 1.0 |
| 16 | −8.0092 | 1.60 | 49.52 | 1.74443 |
| 17 | −8.7968 | (variable) |  | 1.0 |
| 18 | −18.0977 | 2.00 | 25.41 | 1.80518 |
| 19 | −14.3536 | 4.50 |  | 1.0 |
| 20 | −13.7549 | 1.20 | 43.35 | 1.84042 |
| 21 | −97.4058 | (variable) |  | 1.0 |

Shape of Aspherical Surface of the Third Plane

κ = 1.0000   $C_4 = -0.3032 \times 10^{-5}$   $C_6 = -0.1994 \times 10^{-7}$
$C_8 = -0.1769 \times 10^{-9}$   $C_{10} = 0.4808 \times 10^{-12}$ Variable Spacings in Zooming

| f | 28.8000 | 50.0000 | 82.5000 |
|---|---|---|---|
| D 4 | 13.4727 | 6.4727 | 1.4727 |
| D11 | 1.1342 | 8.1342 | 13.1342 |
| D17 | 10.9974 | 4.5990 | 0.5481 |
| D21 | 8.4041 | 25.6236 | 50.6364 |

Figure 3A:
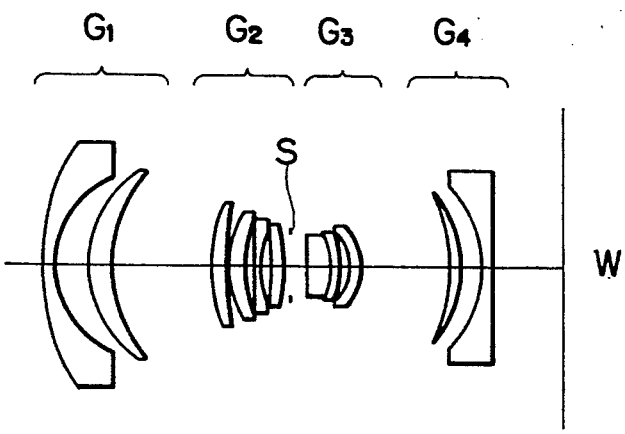
FIGS. 3A to 3C are lens construction drawings to show the fourth embodiment and the fifth embodiment.
Figure 3B:
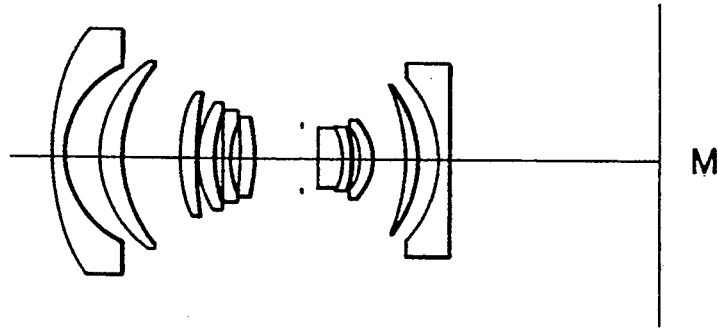
Figure 3C:
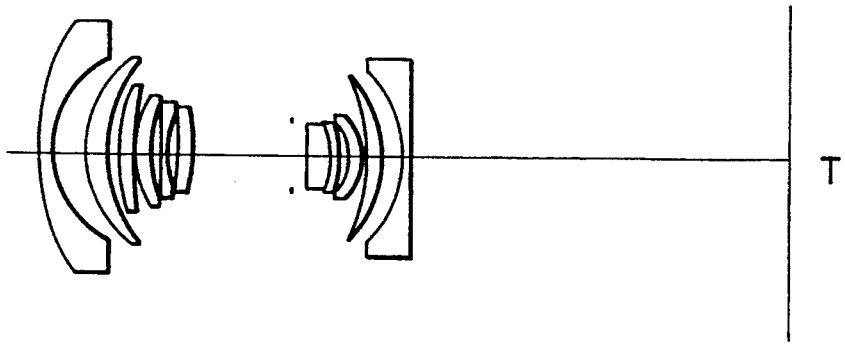

Values for the Conditions (1) $\phi_{1,\,2T}/\phi_T = 0.786$
(2) $\phi_{1,\,2W}/\phi_W = 0.384$
(3) $\beta_4/\beta_2 = 1.557$
(4) $\phi_{3,\,4T}/\phi_T = 0.053$
(5) $\phi_{3,\,4W}/\phi_W = 0.364$ FIGS. 3A to 3C are lens construction drawings to show the fourth embodiment and the fifth embodiment, respectively depicting a state at the wideangle end (W), a state at a middle focus position (M), and a state at the telephoto end (T).

There are a first lens group $G_1$ with negative refracting power composed of a negative meniscus lens convex toward the object and a positive meniscus lens convex toward the object, a second lens group $G_2$ with positive refracting power composed of a double convex lens, a positive meniscus lens, a negative meniscus lens and a positive meniscus lens, an aperture stop S, a third lens group $G_3$ with positive refracting power composed of a compound lens of double convex lens and negative meniscus lens and a positive meniscus lens concave toward the object, and a fourth lens group G$_4$ with negative refracting power composed of a positive meniscus lens concave toward the object and a negative meniscus lens, arranged in the named order from the object side such that the lens groups move relative to each other in zooming from the wideangle end to the telephoto end as the gap decreases between the first lens group G$_1$ and the second lens group G$_2$, the gap increases between the second lens group G$_2$ and the third lens group G$_3$ and the gap decreases between the third lens group G$_3$ and the fourth lens group G$_4$.

Specifications in the present invention will be listed below. In the tables of specifications of the embodiments, f represents the focal length, F$_{NO}$ the f-number, 2ω the field angle, numerals in the left end column orders counted from the object side, and * an aspherical surface. Further, r represents a radius of curvature of each lens surface, d a spacing between lens planes, n and ν an index of refraction and an Abbe's number for d line (λ=587.6 nm). The shape of aspherical surface can be expressed by the following equation with X axis in the direction of optical axis, Y axis in the direction normal to the optical axis, and the traveling direction of light being positive.

$$x = cy^2/\{1+(1-\kappa c^2 y^2)^{\frac{1}{2}}\} + C_4 y^4 + C_6 y^6 C_8 y^8 + C_{10} y^{10}$$

In the equation, c is a paraxial curvature, κ a parameter for the surface of the second order, and $C_4$, $C_6$, $C_8$, $C_{10}$ aspherical coefficients.

TABLE 4

(Specifications for Embodiment 4)

f = 28.8–50.0–87.0
F$_{NO}$ = 3.6–5.6–8.2
2ω = 65.0–46.3–27.6

|   | r | d | ν | n |
|---|---|---|---|---|
| 1 | 33.4213 | 1.50 | 46.54 | 1.80411 |
| 2 | 12.9979 | 3.20 |  | 1.0 |
| *3 | 15.9272 | 2.40 | 25.35 | 1.80518 |
| 4 | 22.1922 | (variable) |  | 1.0 |
| 5 | 42.6658 | 1.40 | 45.37 | 1.79668 |
| 6 | 936.2890 | 0.10 |  | 1.0 |
| 7 | 14.5731 | 2.50 | 60.03 | 1.64000 |
| 8 | 33.1658 | 0.60 |  | 1.0 |
| 8 | 47.7955 | 1.00 | 25.41 | 1.80518 |
| 9 | 16.1864 | 1.80 |  | 1.0 |
| 10 | −32.8802 | 1.40 | 60.03 | 1.64000 |
| 11 | −20.0007 | (variable) |  | 1.0 |
| 12 | ∞ | 2.10 |  | 1.0 (stop) |
| 13 | 243.3206 | 3.30 | 56.05 | 1.56883 |
| 14 | −8.0725 | 1.00 | 40.62 | 1.80600 |
| 15 | −14.5159 | 1.10 |  | 1.0 |
| 16 | −8.4754 | 1.60 | 49.52 | 1.74443 |
| 17 | −9.1758 | (variable) |  | 1.0 |
| 18 | −23.6428 | 2.00 | 25.41 | 1.80518 |
| 19 | −15.6810 | 3.50 |  | 1.0 |
| 20 | −14.8023 | 1.20 | 39.61 | 1.80454 |
| 21 | −217.9083 | (variable) |  | 1.0 |

Shape of Aspherical Surface of the Third Plane

κ = 1.0000  $C_4$ = −0.2264 × 10$^{-6}$  $C_6$ = −0.7078 × 10$^{-8}$
$C_8$ = −0.2289 × 10$^{-9}$  $C_{10}$ = 0.1817 × 10$^{-11}$

Variable Spacings in Zooming

| f | 28.8000 | 50.0000 | 87.0000 |
|---|---|---|---|
| D4 | 13.4338 | 7.4338 | 1.9338 |
| D11 | 0.7336 | 5.7336 | 11.2336 |
| D17 | 12.4373 | 4.8812 | 0.4062 |
| D21 | 9.5608 | 29.7884 | 59.9849 |

TABLE 4-continued

Values for the Conditions (1) $\phi_{1,2T}/\phi_T$ = 0.823
(2) $\phi_{1,2W}/\phi_W$ = 0.451
(3) $\beta_4/\beta_2$ = 1.314
(4) $\phi_{3,4T}/\phi_T$ = 0.071
(5) $\phi_{3,4W}/\phi_W$ = 0.301

TABLE 5

(Specifications for Embodiment 5)

f = 28.8–50.0–83.0
F$_{NO}$ = 4.0–5.9–8.2
2ω = 75.0–46.4–28.9

|   | r | d | ν | n |
|---|---|---|---|---|
| 1 | 31.1891 | 1.50 | 55.60 | 1.69680 |
| 2 | 13.0801 | 4.50 |  | 1.0 |
| 3 | 15.6988 | 3.00 | 25.35 | 1.80518 |
| 4 | 18.9336 | (variable) |  | 1.0 |
| 5 | 21.7135 | 2.30 | 50.84 | 1.65844 |
| 6 | 68.6147 | 0.10 |  | 1.0 |
| 7 | 14.4899 | 2.20 | 57.03 | 1.62280 |
| 8 | 21.7186 | 1.10 |  | 1.0 |
| 8 | −3038.8263 | 1.00 | 25.35 | 1.80518 |
| 9 | 20.0592 | 1.00 |  | 1.0 |
| 10 | 547.9474 | 2.10 | 55.60 | 1.69680 |
| 11 | −24.5654 | (variable) |  | 1.0 |
| 12 | ∞ | 2.10 |  | 1.0 (stop) |
| 13 | 131.2018 | 3.30 | 56.05 | 1.56883 |
| 14 | −10.0662 | 1.00 | 40.62 | 1.80600 |
| 15 | −16.2873 | 1.40 |  | 1.0 |
| 16 | −7.1404 | 1.60 | 49.52 | 1.74443 |
| 17 | −7.9510 | (variable) |  | 1.0 |
| 18 | −25.4488 | 2.00 | 25.35 | 1.80518 |
| 19 | −16.4397 | 3.00 |  | 1.0 |
| 20 | −15.6213 | 1.20 | 43.35 | 1.84042 |
| 21 | −3799.8198 | (variable) |  | 1.0 |

Variable Spacings in Zooming

| f | 28.8000 | 50.0000 | 87.000 |
|---|---|---|---|
| D4 | 13.1479 | 7.6479 | 1.1479 |
| D11 | 0.8511 | 6.3511 | 12.8511 |
| D17 | 13.1479 | 4.0530 | 0.5345 |
| D21 | 9.1226 | 28.0754 | 49.7131 |

Values for the Conditions (1) $\phi_{1,2T}/\phi_T$ = 1.041
(2) $\phi_{1,2W}/\phi_W$ = 0.538
(3) $\beta_4/\beta_2$ = 1.368
(4) $\phi_{3,4T}/\phi_T$ = −0.262
(5) $\phi_{3,4W}/\phi_W$ = 0.185

As described above, the present invention can provide the compact and high-performance zoom lens covering the wideangle range,

What is claimed is:

1. A wideangle-range-covering zoom lens comprising:
   a first lens group having a negative refracting power;
   a second lens group having a positive refracting power, which is arranged coaxially with said first lens group and adjacent to said first lens group on a side thereof opposite to a subject;
   a third lens group having a positive refracting power, which is arranged coaxially with said second lens group and adjacent to said second lens group on a side thereof opposite to the subject; and
   a fourth lens group having a negative refracting power, which is arranged coaxially with said third lens group and adjacent to said third lens group on a side thereof opposite to the subject;
   wherein said lens groups are relatively moved in zooming from a wideangle end to a telephoto end such that a gap decreases between said first lens group and said second lens group, a gap increases between said second lens group and said third lens group, and a gap decreases between said third lens group and said fourth lens group, and wherein the following conditions are satisfied:

$$0.1 < \phi_{1,2T}/\phi_T; \text{ and}$$

$$\phi_{1,2W}/\phi_W < 0.57;$$

where
- $\phi_{1,2T}$: a composite refracting power of the first lens group and the second lens group at the telephoto end;
- $\phi_T$: an overall refracting power at the telephoto end;
- $\phi_{1,2W}$: a composite refracting power of the first lens group and the second lens group at the wideangle end;
- $\phi_W$: an overall refracting power at the wideangle end.

2. A wideangle-range-covering zoom lens according to claim 1, wherein the following conditions are satisfied:

$$\phi_{3,4T}/\phi_T < 0.8; \text{ and}$$

$$0.16 < \phi_{3,4W}/\phi_W;$$

where
- $\phi_{3,4T}$: a composite refracting power of the third lens group and the fourth lens group at the telephoto end;
- $\phi_T$: an overall refracting power at the telephoto end;
- $\phi_{3,4W}$: a composite refracting power of the third lens group and the fourth lens group at the wideangle end;
- $\phi_W$: an overall refracting power at the wideangle end.

3. A wideangle-range-covering zoom lens comprising:
- a first lens group having a negative refracting power;
- a second lens group having a positive refracting power, which is arranged coaxially with said first lens group and adjacent to said first lens group on a side thereof opposite to a subject;
- a third lens group having a positive refracting power, which is arranged coaxially with said second lens group and adjacent to said second lens group on a side thereof opposite to the subject; and
- a fourth lens group having a negative refracting power, which is arranged coaxially with said third lens group and adjacent to said third lens group on a side thereof opposite to the subject;

wherein said lens groups are relatively moved in zooming from a wideangle end to a telephoto end such that a gap decreases between said first lens group and said second lens group, a gap increases between said second lens group and said third lens group, and a gap decreases between said third lens group and said fourth lens group, and wherein the following conditions are satisfied:

$$\beta_4/\beta_2 > 1 \text{ and } \beta_2 > 1 \text{ and } \beta_4 > 1;$$

where
- $\beta_4$: an amount expressed by the following equation if $\beta_{4W}$ and $\beta_{4T}$ are use magnifications of the fourth lens group at the wideangle end and at the telephoto end, respectively: $\beta_4 = \beta_{4T}/\beta_{4W}$;
- $\beta_2$: an amount expressed by the following equation if $\beta_{2W}$ and $\beta_{2T}$ are use magnifications of the second lens group at the wideangle end and at the telephoto end, respectively: $\beta_2 = \beta_{2T}/\beta_{2W}$.

4. A wideangle-range-covering zoom lens according to claim 3, wherein the following conditions are satisfied:

$$\phi_{3,4T}/\phi_T < 0.8; \text{ and}$$

$$0.16 < \phi_{3,4W}/\phi_W;$$

where
- $\phi_{3,4T}$: a composite refracting power of the third lens group and the fourth lens group at the telephoto end;
- $\phi_T$: an overall refracting power at the telephoto end;
- $\phi_{3,4W}$: a composite refracting power of the third lens group and the fourth lens group at the wideangle end;
- $\phi_W$: an overall refracting power at the wideangle end.

* * * * *